(12) United States Patent
Irie

(10) Patent No.: US 9,477,828 B2
(45) Date of Patent: Oct. 25, 2016

(54) AUTHENTICATION DEVICE, AUTHENTICATION METHOD AND NON-TRANSITORY COMPUTER-READABLE RECORDING MEDIUM

(71) Applicant: OMRON Corporation, Kyoto-Shi (JP)

(72) Inventor: Atsushi Irie, Nara (JP)

(73) Assignee: OMRON Corporation, Kyoto (JP)

( * ) Notice: Subject to any disclaimer, the term of this patent is extended or adjusted under 35 U.S.C. 154(b) by 189 days.

(21) Appl. No.: 14/219,756

(22) Filed: Mar. 19, 2014

(65) Prior Publication Data

US 2014/0310803 A1    Oct. 16, 2014

(30) Foreign Application Priority Data

Apr. 15, 2013 (JP) .................................. 2013-085280

(51) Int. Cl.
*G06F 21/32* (2013.01)
*G06K 9/00* (2006.01)

(52) U.S. Cl.
CPC ........... *G06F 21/32* (2013.01); *G06K 9/00597* (2013.01); *G06K 9/00899* (2013.01)

(58) Field of Classification Search
CPC ...................................................... G06F 21/32
USPC .......................................................... 726/19
See application file for complete search history.

(56) References Cited

U.S. PATENT DOCUMENTS

| | | | | |
|---|---|---|---|---|
| 4,641,349 A * | 2/1987 | Flom | .................... | A61B 3/1216 351/205 |
| 5,335,035 A * | 8/1994 | Maeda | ..................... | G02B 7/28 351/210 |
| 5,917,495 A * | 6/1999 | Doi | ......................... | G06F 3/016 345/419 |
| 6,049,875 A * | 4/2000 | Suzuki | .................... | G06F 21/32 340/5.74 |
| 6,111,580 A * | 8/2000 | Kazama | .................. | G06F 3/011 340/575 |
| 6,298,176 B2 * | 10/2001 | Longacre, Jr. | ................ | 382/312 |
| 6,384,942 B1 * | 5/2002 | Tamamura | .......... | H04N 1/1013 358/475 |

(Continued)

FOREIGN PATENT DOCUMENTS

CN       101710383 A  *  5/2010
JP       2004-220376 A     8/2004

(Continued)

OTHER PUBLICATIONS

Wang, "Method and device for identity authentication", CN101710383A, 2010.*

(Continued)

*Primary Examiner* — O. C. Vostal
(74) *Attorney, Agent, or Firm* — Nutter McClennen & Fish LLP; John J. Penny, Jr.; Ashley B. Tarokh

(57) ABSTRACT

To prevent improper authentication, a authentication device includes a visual-line detecting unit configured to detect a visual line direction of a user, an authentication-permission visual-line direction setting unit configured to set an authentication permission visual-line direction, a biometric deciding unit configured to execute authentication by deciding whether a detected visual line direction is an authentication permission visual-line direction, and a display control unit configured to cause a display unit to display an image showing a type of a visual line direction in setting an authentication permission visual-line direction and configured to cause the display unit not to display the image in executing authentication.

11 Claims, 8 Drawing Sheets

(56) References Cited

U.S. PATENT DOCUMENTS

| | | | | |
|---|---|---|---|---|
| 7,684,651 B2* | 3/2010 | Tang | | G06F 17/30247 382/115 |
| 7,936,902 B2* | 5/2011 | Kinoshita | | G06K 9/00281 348/169 |
| 2005/0129286 A1* | 6/2005 | Hekimian | | G06K 9/00899 382/117 |
| 2005/0180740 A1* | 8/2005 | Yokoyama | | G06F 1/1626 396/421 |
| 2007/0197285 A1* | 8/2007 | Kamijo | | A63F 13/10 463/31 |
| 2008/0036766 A1* | 2/2008 | Ishii | | G06T 3/0031 345/427 |
| 2008/0055453 A1* | 3/2008 | Battles | | G03B 13/02 348/333.05 |
| 2008/0062297 A1* | 3/2008 | Sako | | G02B 27/017 348/333.02 |
| 2008/0088646 A1* | 4/2008 | Sako | | H04N 13/044 345/647 |
| 2009/0128311 A1* | 5/2009 | Nishimura | | G08G 1/166 340/435 |
| 2009/0240431 A1* | 9/2009 | Chau | | G01C 21/3647 701/532 |
| 2010/0002941 A1* | 1/2010 | Fonseca | | G06K 9/00664 382/209 |
| 2010/0211994 A1* | 8/2010 | Yamaguchi | | A63F 13/12 726/3 |
| 2010/0253682 A1* | 10/2010 | Panahpour Tehrani | | G06T 15/405 345/422 |
| 2012/0212407 A1* | 8/2012 | Tanaka | | G06F 3/013 345/156 |
| 2013/0051611 A1* | 2/2013 | Hicks | | G06T 11/60 382/103 |
| 2013/0286350 A1* | 10/2013 | Sakashita | | A61B 3/14 351/208 |
| 2014/0218804 A1* | 8/2014 | Tanahashi | | G02B 27/0025 359/630 |

FOREIGN PATENT DOCUMENTS

| | | |
|---|---|---|
| JP | 3562970 B2 | 9/2004 |
| JP | 2005-149326 A | 6/2005 |
| JP | 4470663 B2 | 6/2010 |
| JP | 4807167 B2 | 11/2011 |

OTHER PUBLICATIONS

Tanaka et al., "A High-Accuracy Visual Marker Based on a Microlens Array", 2012.*
European Search Report for corresponding application No. EP 14 15 9844 dated Jun. 20, 2014 (7 pages).

* cited by examiner

VISUAL-LINE ANGLE

| | RIGHT AND LEFT | -20 DEGREES | 20 DEGREES |
|---|---|---|---|
| UP AND DOWN | UPPER LEFT | UP | UPPER RIGHT |
| 10 DEGREES | LEFT | CENTER | RIGHT |
| -10 DEGREES | LOWER LEFT | DOWN | LOWER RIGHT |

AUTHENTICATION DEVICE, AUTHENTICATION METHOD AND NON-TRANSITORY COMPUTER-READABLE RECORDING MEDIUM

CROSS-REFERENCE TO RELATED APPLICATION(S)

This application claims the benefit of priority from Japanese Patent Application No. 2013-085280, filed 15 Apr. 2013, the entire contents of which is incorporated herein by reference for all purposes.

BACKGROUND

The present invention relates to an authentication device and an authentication method of executing authentication based on an image, and a non-transitory computer-readable recording medium.

In recent years, there has been increasing progress in the high-functionality and multi-functionality functions of portable devices such as a portable telephone, a mobile computer, a portable game device, and a music reproducing device. Following the progress in such high-functionalization and multi-functionalization functions, a security measure for preventing improper use of a portable device has become important.

For a security measure, a face recognition technique of using a camera which is becoming a standard installation in a portable device is the focus of attention. Personal authentication (face authentication) to which the face recognition technique is applied can confirm an owner by photographing a face from among natural movements, and is, therefore, valid as a security measure which is also highly convenient.

On the other hand, as a task of a face recognition technique, there is a countermeasure against "impersonation" that uses a photograph or the like. The "impersonation" is a behavior that a person other than an eligible person attempts to receive authentication by using a photograph or the like of the eligible person. Particularly, recent portable devices include a megapixel-class camera and have a focus function and a close-up photography function. Therefore, there is a risk that impersonation can be easily done by using a snap photograph or a small photograph such as a photograph for a driving license.

Therefore, techniques of preventing impersonation are being developed. For example, Japanese Patent Publication No. 3562970 discloses a technique of preventing impersonation by deciding whether a visual line of a user is directed to a light source that guides the visual line of the user. Further, Japanese Patent Publication No. 4470663 discloses a technique of preventing impersonation by deciding whether a visual line movement of a user coincides with a track of a mark displayed on a display by moving the mark at random. Japanese Patent Publication No. 4807167 discloses a technique of preventing impersonation by deciding whether a visual line of a user is directed to a display unit. Japanese Unexamined Patent Publication No. 2004-220376 discloses a technique of executing an authentication process by deciding whether a track of a pointer indicating a visual line direction of a user coincides with a predetermined movement pattern, by displaying the pointer and moving the pointer according to an iris position of the user. Further, Japanese Unexamined Patent Publication No. 2005-149326 discloses a technique of executing authentication by deciding whether an image that a user gazes at is a registered image, by detecting a visual line of the user.

However, in conventional techniques as described above, since input candidates (a type of a visual line direction, a guidance mark, an image as a selection alternative, and the like that can be input) are displayed at the time of impersonation prevention decision, another person may easily know the authentication method. Therefore, the conventional techniques have a problem in that there is a case that the impersonation prevention decision for preventing improper authentication does not validly function.

SUMMARY

Therefore, there is a need to realize an authentication device, an authentication method, and a non-transitory computer-readable recording medium for preventing improper authentication.

In an embodiment of the invention, there is an authentication device that executes authentication based on an image. The authentication device includes a visual-line detecting unit configured to detect a visual line direction of a subject photographed in the image, an authentication-permission visual-line direction setting unit configured to set a visual line direction for permitting authentication, an authentication executing unit configured to execute authentication by deciding whether a visual line direction detected by the visual-line detecting unit is an authentication permission visual-line direction set by the authentication-permission visual-line direction setting unit, and a display control unit configured to cause a display unit to display an image showing a type of a visual line direction in setting an authentication permission visual-line direction by the authentication-permission visual-line direction setting unit and configured to cause the display unit not to display the image in executing authentication by the authentication executing unit.

An effect of the invention is that improper authentication can be prevented.

DETAILED DESCRIPTION

An embodiment of the present invention is described below with reference to FIG. 1 to FIG. 5.

(Configuration of Authentication Device)

An authentication device 1 executes authentication of an individual person by deciding based on an image whether a user is an owner of the authentication device 1 or an electronic device in which the authentication device 1 is installed. More specifically, the authentication device 1 decides whether a user is an owner, based on a facial image of the user. Further, the authentication device 1 decides whether a user in a photographed image is a biometric body, by detecting a visual line direction of the user before executing the authentication of an individual person, to prevent impersonation. That is, the authentication device 1 executes authentication of an individual person based on a facial image, after biometric authentication is correctly executed by performing impersonation prevention decision.

In the present embodiment, an authentication method according to the present invention is described as an authentication method to be used for the impersonation prevention decision. However, the authentication method is not limited to be applied to only the impersonation prevention decision. That is, the authentication method is not limited to be applied to only biometric authentication performed before the authentication of an individual person, but the authentication method may be also applied to authentication of an individual person itself.

The authentication device 1 may be installed in electronic devices such as a portable telephone, a smartphone, a PC, a digital camera, a digital video camera, a PDA (Personal Digital Assistant), a game machine, a device that takes a picture and prints the picture, and a device that edits an image. In the present embodiment, the authentication device 1 is assumed to be installed in a portable telephone, and a person to be authenticated is assumed to be an owner of the portable telephone.

Figure 1:
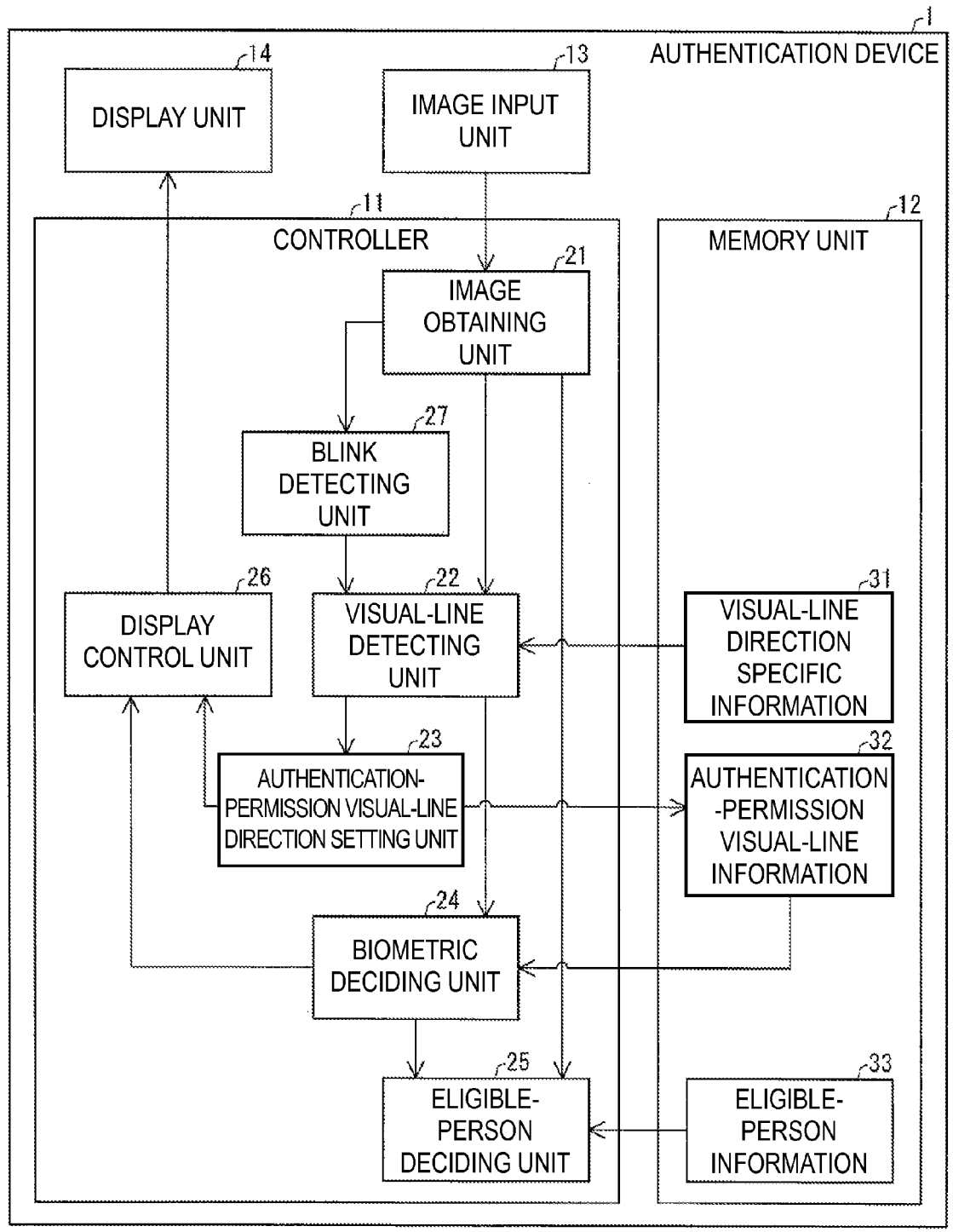
FIG. 1 is a block diagram showing a configuration of an authentication device according to an embodiment.

A configuration of the authentication device 1 is described with reference to FIG. 1. FIG. 1 is a block diagram showing an example of a relevant configuration of the authentication device 1. As shown in FIG. 1, the authentication device 1 includes a controller 11, a memory unit 12, an image input unit 13, and a display unit 14. The authentication device 1 may include a component such as an operating unit, a communicating unit, a voice input unit, a voice output unit, and the like. However, since the component is not related to a feature point of the invention, the component is not shown in the drawings.

The image input unit 13 is an interface for obtaining an image from an external image providing device (not shown). The image providing device may be any device that provides a held image or an obtained image to other device. For example, image providing devices are a digital camera, a digital video camera, a portable telephone, a smartphone, a PDA, a game machine, and a storage device of a USB (Universal Serial Bus) memory. The authentication device 1 may be installed with a camera in place of the image input unit 13.

The display unit 14 displays an image following an instruction of the controller 11. The display unit 14 may be a unit that displays an image following an instruction of the controller 11. For example, an LCD (Liquid Crystal Display), an organic EL display, and a plasma display can be used for the display unit 14. The authentication device 1 may not include the display unit 14. In this case, the authentication device 1 causes a separate display device to display an image.

The controller 11 performs various calculations and also controls, as a whole, each unit included in the authentication device 1, by executing a program read from the memory unit 12 into a temporary memory unit (not shown).

In the present embodiment, the controller 11 includes, as functional blocks, an image obtaining unit 21, a visual-line detecting unit 22, an authentication-permission visual-line direction setting unit 23, a biometric deciding unit (authentication executing unit) 24, an eligible-person deciding unit 25, and a display control unit 26. Further, the controller 11 may also include a blink detecting unit 27, as shown in FIG. 1. The functional blocks (21 to 27) of the controller 11 can be realized by a CPU (Central Processing Unit) that executes programs stored in the storage device realized by a ROM (Read Only Memory) and the like, by reading the programs into a temporary memory unit realized by a RAM (Random Access Memory) and the like.

The image obtaining unit 21 obtains an image that the user photographed via the image input unit 13. The image obtaining unit 21 outputs the obtained image to the visual-line detecting unit 22, the eligible-person deciding unit 25, and the blink detecting unit 27. When an image is stored in the memory unit 12, the image obtaining unit 21 may read the image from the memory unit 12.

The visual-line detecting unit 22 obtains an image from the image obtaining unit 21, and detects a visual line direction of the user photographed in the image. Specifically, the visual-line detecting unit 22 specifies a visual-line angle of the user photographed in the image, and specifies a visual line direction corresponding to the specified visual-line angle by referring to visual-line direction specific information 31 on a correspondence relation between the visual-line angle and the visual line direction. The visual-line detecting unit 22 outputs the specified visual line direction to the authentication-permission visual-line direction setting unit 23 and the biometric deciding unit 24.

Figures 2, 3:
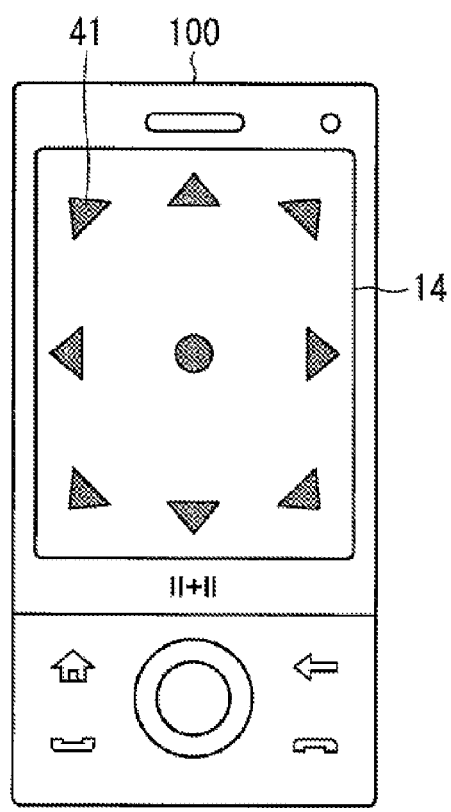
FIG. 2 is a view showing an example of visual-line angle specific information on a correspondence relation between a visual-line angle and a visual line direction.
FIG. 3 is a view showing an example of a visual-line angle-type image that shows a type of a visual-line angle displayed in a display unit.

In this case, the visual-line direction specific information 31 is information as shown in FIG. 2, for example. In the visual-line direction specific information 31 shown in FIG. 2, there are nine types of visual line directions. As shown in FIG. 2, when a visual-line angle of right and left (horizontal direction) is larger than 20 degrees and also when a visual-line angle of up and down (vertical direction) is larger than 10 degrees, a visual line direction becomes upper right. When a visual-line angle of right and left (horizontal direction) is equal to or larger than −20 degrees and equal to or smaller than 20 degrees and also when a visual-line angle of up and down (vertical direction) is equal to or larger than −10 degrees and equal to or smaller than 10 degrees, a visual line direction becomes center. When a visual-line angle of right and left (horizontal direction) is smaller than −20 degrees and also when a visual-line angle of up and down (vertical direction) is smaller than −10 degrees, a visual line direction becomes lower left.

The visual-line direction specific information 31 shown in FIG. 2 is an example, and a correspondence relation between a visual-line angle and a visual line direction may be suitably set. For example, a visual line direction may have four types, up and down, right and left, and a range of a corresponding visual-line angle may be arbitrarily changed.

The visual-line direction specific information 31 is set in advance. However, it is preferable that a correspondence relation between a visual-line angle and a visual line direction is set based on a position of a camera and a position of the face of a user. Therefore, it is preferable that the visual-line direction specific information 31 is corrected for each user or at each time of setting an authentication permission visual-line direction.

Further, the visual-line detecting unit 22 may specify a plurality of visual-line angles from a plurality of images photographed during a predetermined period, and specify a visual-line angle corresponding to an average value, a most frequently-appearing angle, or an intermediate value of the plurality of visual-line angles. With this configuration, even when a visual-line angle of a user is not stable, a highly reliable visual line direction of the user can be specified.

The visual-line detecting unit 22 may specify a visual-line angle of a user photographed in an image, and output the specified visual-line angle itself to the authentication-permission visual-line direction setting unit 23 and the biometric deciding unit 24.

A method of detecting a visual line direction of a user from an image is not limited to the above method, and a known technique can be used. For example, a visual line direction may be detected based on a position of an iris.

The authentication-permission visual-line direction setting unit 23 sets a visual line direction for permitting an impersonation prevention decision (biometric authentication). The authentication-permission visual-line direction setting unit 23 stores authentication-permission visual-line information 32 having a set authentication permission visual-line direction, in the memory unit 12. The visual line direction for permitting the biometric authentication is referred to as an authentication permission visual-line direction.

Specifically, the authentication-permission visual-line direction setting unit 23 urges the user to register an authentication permission visual-line direction, and sets a visual line direction detected by the visual-line detecting unit 22, as the authentication permission visual-line direction. The authentication-permission visual-line direction setting unit 23 may set a visual line direction that the user inputs by operating an operating unit such as a keyboard and a mouse, as the authentication permission visual-line direction.

When the authentication-permission visual-line direction setting unit 23 obtains a visual-line angle from the visual-line detecting unit 22, the authentication-permission visual-line direction setting unit 23 sets the obtained visual-line angle as the authentication-permission visual-line angle. In this case, the authentication-permission visual-line direction setting unit 23 stores information having the set authentication-permission visual-line angle into the memory unit 12, as the authentication-permission visual-line information 32.

The authentication-permission visual-line direction setting unit 23 may set a plurality of authentication permission visual-line directions or authentication-permission visual-line angles in a predetermined order.

The biometric deciding unit 24 reads the authentication-permission visual-line information 32 from the memory unit 12, and decides whether a visual line direction detected by the visual-line detecting unit 22 is an authentication permission visual-line direction of the authentication-permission visual-line information 32. When the visual line direction detected by the visual-line detecting unit 22 is the authentication permission visual-line direction, the biometric deciding unit 24 decides that authentication has been correctly performed. That is, the biometric deciding unit 24 decides that the user photographed in the image is a biometric body. The biometric deciding unit 24 notifies the eligible-person deciding unit 25 that biometric authentication has been correctly performed.

On the other hand, when the visual line direction detected by the visual-line detecting unit 22 is not the authentication permission visual-line direction, the biometric deciding unit 24 decides that authentication has not been correctly performed. That is, the biometric deciding unit 24 decides that the user photographed in the image is not a biometric body. At this time, the biometric deciding unit 24 may notify the display control unit 26 that biometric authentication has not been correctly performed.

When the visual-line detecting unit 22 outputs a visual-line angle, the biometric deciding unit 24 decides whether a difference value (absolute value) between the visual-line angle detected by the visual-line detecting unit 22 and the authentication-permission visual-line angle of the authentication-permission visual-line information 32 is equal to or smaller than a predetermined threshold value. When a difference value between the visual-line angle detected by the visual-line detecting unit 22 and the authentication-permission visual-line angle is equal to or smaller than a predetermined threshold value, the biometric deciding unit 24 decides that authentication has been correctly performed. On the other hand, when a difference value between the visual-line angle detected by the visual-line detecting unit 22 and the authentication-permission visual-line angle is not equal to or smaller than a predetermined threshold value, the biometric deciding unit 24 decides that authentication has not been correctly performed.

For example, it is assumed that both threshold values in the horizontal direction and the vertical direction are 5 degrees. Further, it is assumed that authentication-permission visual-line angles in the horizontal direction and the vertical direction are 9 degrees and 11 degrees, respectively, and that visual-line angles in the horizontal direction and the vertical direction detected by the visual-line detecting unit 22 are 13 degrees and 8 degrees, respectively. In this case, since difference values in the horizontal direction and the vertical direction are 4 degrees and 3 degrees, respectively, the biometric deciding unit 24 decides that the difference values are equal to or smaller than the threshold values.

The visual-line detecting unit 22 may output a visual line direction and a visual-line angle to both the authentication-permission visual-line direction setting unit 23 and the biometric deciding unit 24. In this case, the biometric deciding unit 24 may execute biometric authentication by using both the visual line direction and the visual-line angle.

For example, the biometric deciding unit 24 may make a decision based on the visual-line angle in the case where a visual-line angle detected by the visual-line detecting unit 22 is near a boundary of classifying a visual line direction, and the biometric deciding unit 24 may make a decision based on the visual line direction in other cases. The boundary of classifying a visual line direction is a visual-line angle of 20 degrees or −20 degrees in the horizontal direction, and a visual-line angle of 10 degrees or −10 degrees in the vertical direction, in the case of the visual-line direction specific information 31 shown in FIG. 2.

For example, when reliability (precision) of face detection or visual-line detection to be described later is high, a decision may be made based on the visual line direction, and when reliability is low, a decision may be made based on the visual-line angle.

When the authentication-permission visual-line direction setting unit 23 sets a plurality of authentication permission visual-line directions or authentication-permission visual-line angles in a predetermined order, the biometric deciding unit 24 may execute authentication by deciding whether the visual-line detecting unit 22 has output the plurality of authentication permission visual-line directions or authentication-permission visual-line angles in the predetermined order set by the authentication-permission visual-line direction setting unit 23.

At this time, the visual-line detecting unit 22 specifies a visual line direction or a visual-line angle for each predetermined period, and outputs a specified result to the biometric deciding unit 24. For example, when the blink detecting unit 27 to be described later detects a blink, the visual-line detecting unit 22 outputs a next visual line direction or visual-line angle. Further, after the visual-line detecting unit 22 detects a certain visual line direction during a predetermined period, the visual-line detecting unit 22 may output the detected visual line direction.

When the eligible-person deciding unit 25 receives the notification indicating that biometric authentication has been correctly performed from the biometric deciding unit 24, the eligible-person deciding unit 25 reads the eligible-person information 33 having a facial image of the owner registered in advance, and decides whether the user photographed in the image obtained from the image obtaining unit 21 is the owner. When a user photographed in the image is the owner, the eligible-person deciding unit 25 decides that authentication of an individual person has been correctly performed. On the other hand, when a user photographed in the image is not the owner, the eligible-person deciding unit 25 decides that authentication of an individual person has not been correctly performed.

The display control unit 26 generates a predetermined image according to a process of each unit, and causes the display unit 14 to display the generated image. Specifically, when the authentication-permission visual-line direction setting unit 23 starts an authentication-permission visual-line direction setting process, the display control unit 26 causes the display unit 14 display an image for urging the user to register an authentication permission visual-line direction. For example, the display control unit 26 causes the display unit 14 to display a text of "Please look at a direction of an authentication permission visual-line direction" or "Please look at in order three directions of authentication permission visual-line directions". At this time, the display control unit 26 causes the display unit 14 to display a visual-line direction-type image showing a visual-line direction-type. For example, the display control unit 26 causes the display unit 14 of a portable telephone 100 to display a marker 41 showing each direction as shown in FIG. 3, as the visual-line direction-type image. The display control unit 26 may also make the display unit 14 display what is shown in FIG. 2, as the visual-line direction-type image.

Figure 4:
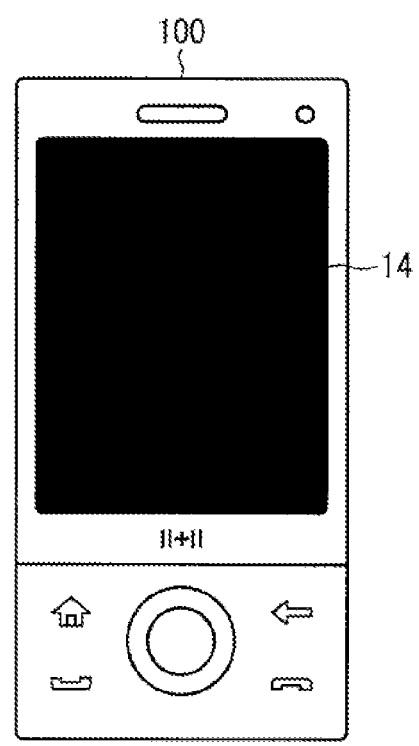
FIG. 4 is a view showing an example of an image that does not suggest a type of a visual line direction displayed in the display unit.

The display control unit 26 causes the display unit 14 to display an image that does not suggest a type of a visual line direction, without having a visual-line direction-type image displayed, at the time of executing biometric authentication by the biometric deciding unit 24. For example, the display control unit 26 may cause the display unit 14 of the portable telephone 100 to display a black image as shown in FIG. 4. The display control unit 26 may also make the display unit 14 display a one-color image, a scenery image, a background image used at a start time, an input image photographed by the user, an image showing that biometric authentication is being executed, or a count image (an image showing an execution period (input period) of biometric authentication). At the time of executing biometric authentication, the display control unit 26 may make the display unit 14 display an image showing that biometric authentication has been started, by superposing the image showing the start of biometric authentication with the image that does not suggest a type of a visual line direction.

Further, the display control unit 26 causes the display unit 14 to display an image showing an input timing, in the case of inputting a plurality of visual line directions. For example, the display control unit 26 may make the display unit 14 display a text such as "Please input a next visual line direction" at a predetermined interval.

Although the display control unit 26 causes the display unit 14 to display a predetermined image and notifies the user, a method of notification to the user is not limited to this method. For example, when the portable telephone includes a speaker, a vibrating unit, or a lamp (such as an LED), a notification to the user may be performed by sound, vibration, or light emission (color).

The blink detecting unit 27 obtains an image from the image obtaining unit 21, and detects a blink of the user photographed in the image. When the blink detecting unit 27 detects a blink, the blink detecting unit 27 notifies the visual-line detecting unit 22 of the detection.

The memory unit 12 stores programs and data that the controller 11 refers to, and stores, for example, the visual-line direction specific information 31, the authentication-permission visual-line information 32, and the eligible-person information 33.

(Authentication-Permission Visual-Line Direction Setting Process)

Figure 5:
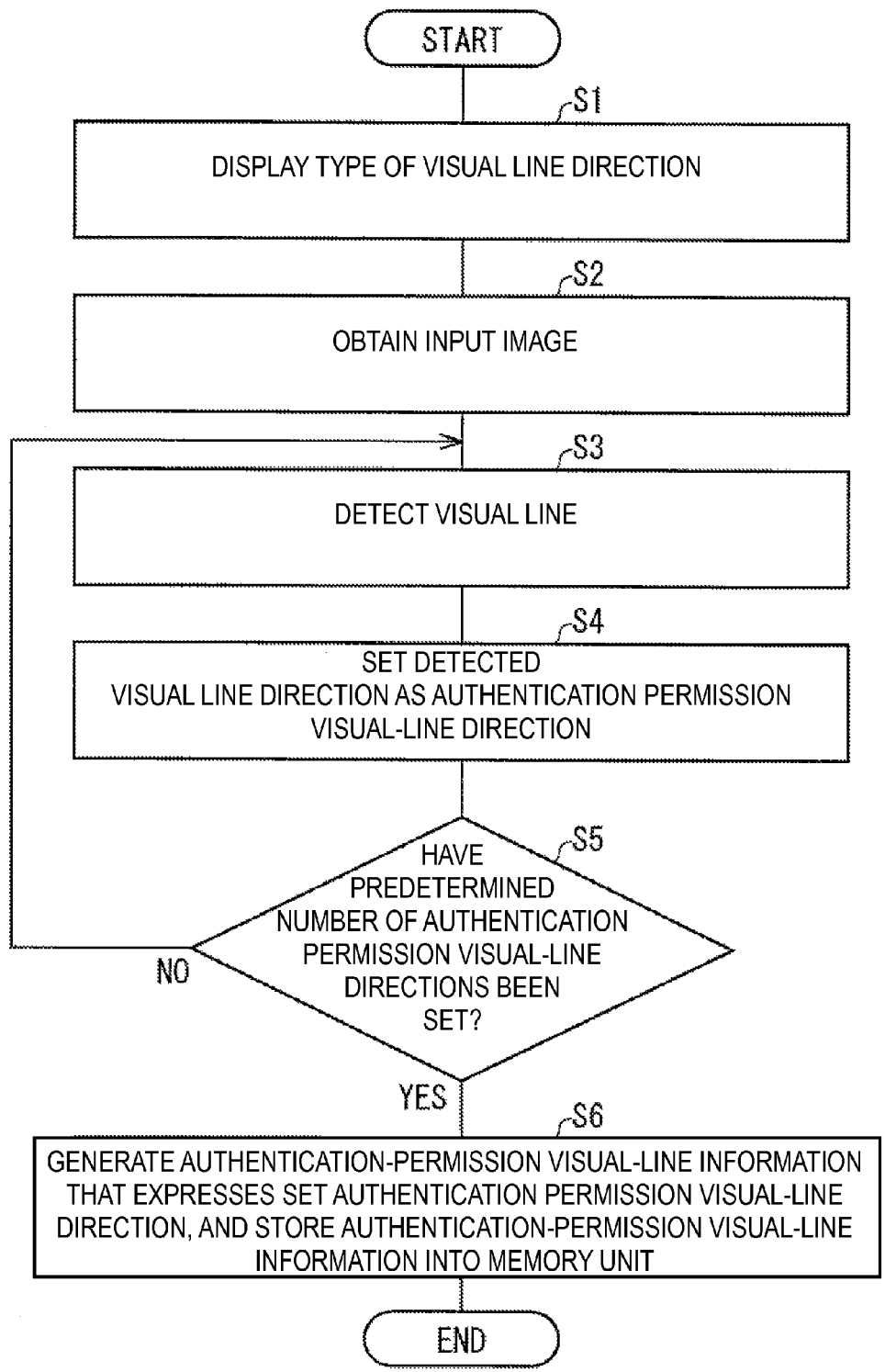
FIG. 5 is a flowchart showing an example of an authentication-permission visual-line direction setting process that an authentication device executes.

Next, an authentication-permission visual-line direction setting process that the authentication device 1 executes is described with reference to FIG. 5. FIG. 5 is a flowchart showing an example of the authentication-permission visual-line direction setting process that the authentication device 1 executes.

As shown in FIG. 5, when the authentication-permission visual-line direction setting unit 23 starts the authentication-permission visual-line direction setting process, the display control unit 26 causes the display unit 14 to display a visual-line direction-type image showing a type of a visual line direction (S1). Then, the image obtaining unit 21 obtains an input image via the image input unit 13 (S2). Next, the visual-line detecting unit 22 detects a visual line direction of the user from the input image (S3). The authentication-permission visual-line direction setting unit 23 sets the visual line direction detected by the visual-line detecting unit 22, as an authentication permission visual-line direction (S4).

Next, the authentication-permission visual-line direction setting unit 23 decides whether a predetermined number of authentication permission visual-line directions have been set (S5). When a predetermined number of authentication permission visual-line directions have not been set (NO in S5), the authentication-permission visual-line direction setting unit 23 makes the user input the visual line direction. On the other hand, when a predetermined number of authentication permission visual-line directions have been set (YES in S5), the authentication-permission visual-line direction setting unit 23 generates the authentication-permission visual-line information 32 having the set authentication permission visual-line direction, and stores the authentication-permission visual-line information 32 into the memory unit 12 (S6).

Biometric Authentication Process

Example 1

Figure 6:
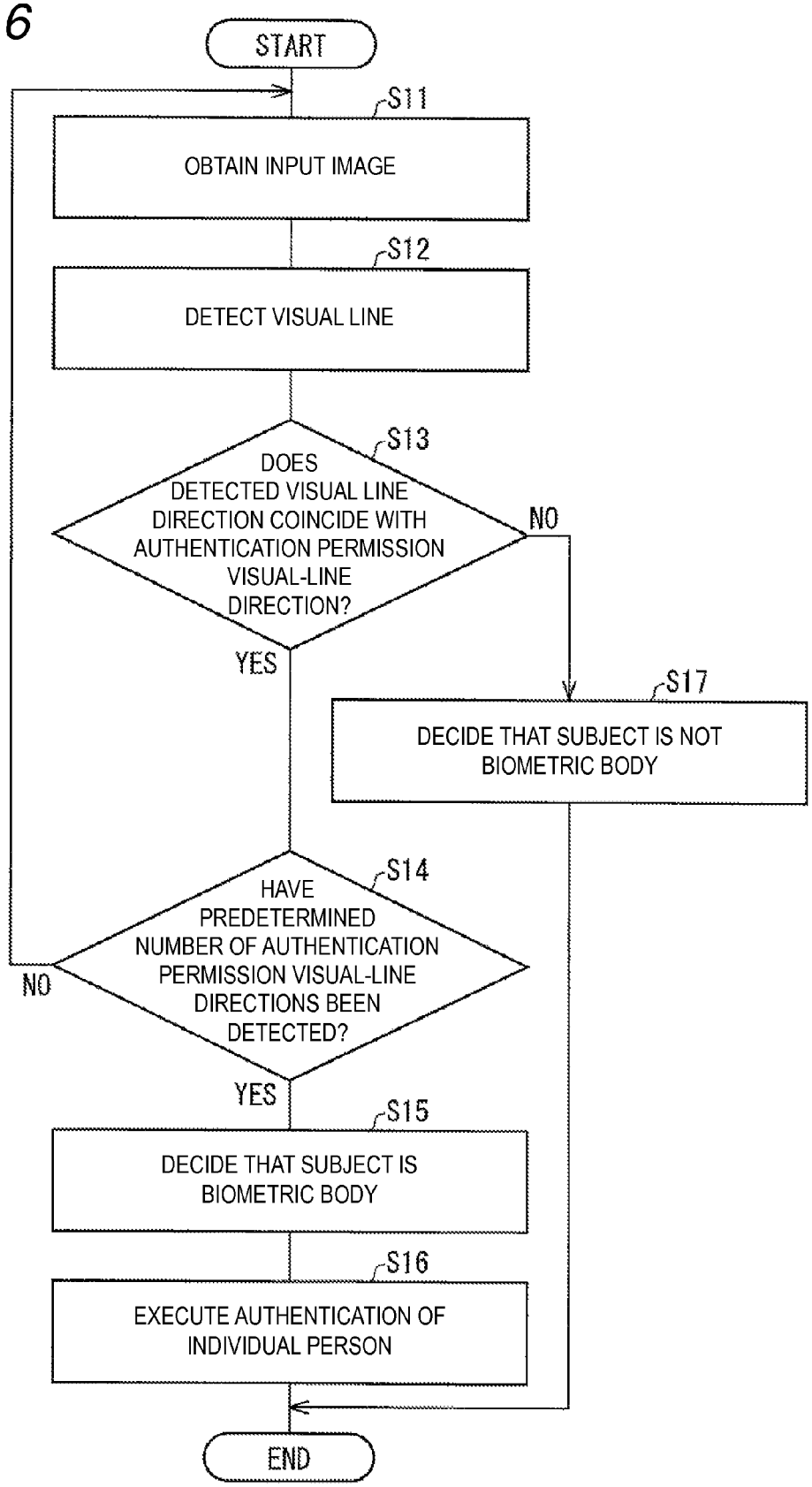
FIG. 6 is a flowchart showing an example of an authentication process that the authentication device executes.

Next, an authentication process that the authentication device 1 executes is described with reference to FIG. 6. FIG. 6 is a flowchart showing an example (Example 1) of the authentication process that the authentication device 1 executes.

As shown in FIG. 6, when the authentication process starts, the display control unit 26 does not make the display unit 14 display a visual-line direction-type image, differently from the authentication-permission visual-line direction setting process shown in FIG. 5. In this state, the image obtaining unit 21 obtains the input image via the image input unit 13 (S11). Next, the visual-line detecting unit 22 detects a visual line direction of the user from the input image (S12). The biometric deciding unit 24 decides whether the visual line direction detected by the visual-line detecting unit 22 is the authentication permission visual-line direction (S13).

When the visual line direction detected by the visual-line detecting unit 22 is the authentication permission visual-line direction (YES in S13), the biometric deciding unit 24 decides whether a predetermined number of authentication permission visual-line directions have been detected in a predetermined order of the authentication-permission visual-line information 32 (S14). When a predetermined number of authentication permission visual-line directions are not detected (NO in S14), the processing of S11 to S13 are repeated.

When a predetermined number of authentication permission visual-line directions are detected in a predetermined order of the authentication-permission visual-line information 32 (YES in S14), the biometric deciding unit 24 decides that the subject is a biometric body (S15). Then, the eligible-person deciding unit 25 decides whether the subject is the owner, based on the image, and executes authentication of an individual person (S16).

In S13, when the visual line direction detected by the visual-line detecting unit 22 is not the authentication permission visual-line direction (No in S13), the biometric deciding unit 24 decides that the subject is not a biometric body (S17), and ends the processing without executing the authentication of an individual person. In S16, when the subject is not the owner, the eligible-person deciding unit 25 decides that the subject is not an eligible owner. In these cases, the display control unit 26 may make the display unit 14 display an image showing that authentication has not been correctly performed.

In S11, although a visual-line direction-type image is not displayed, a message indicating a process start such as "The authentication process will be started" or "The biometric authentication will be started" may be displayed.

Example 2

Figure 7:
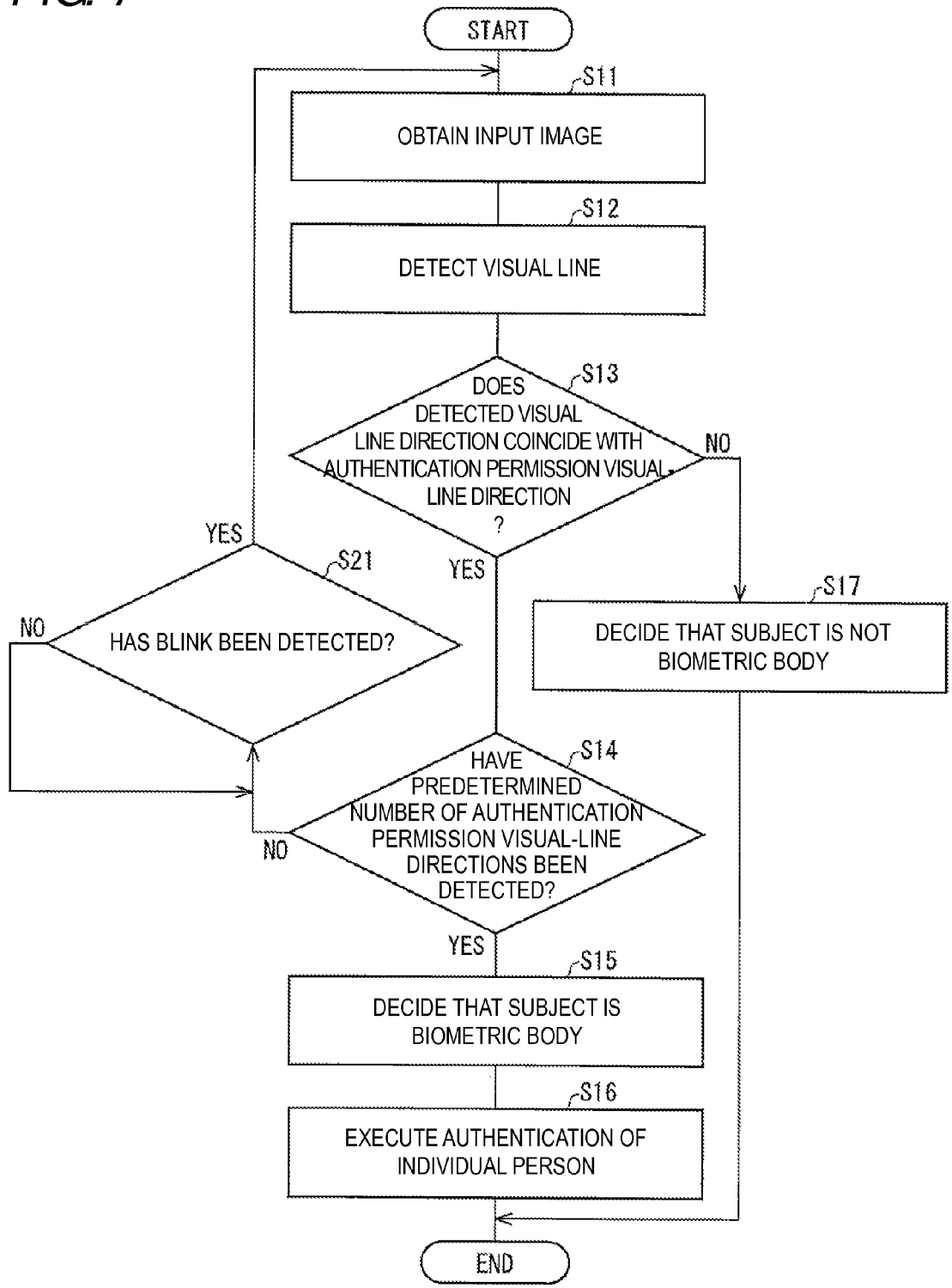
FIG. 7 is a flowchart showing another example of an authentication process that the authentication device executes.

Next, another example of the biometric authentication process that the authentication device 1 executes is described with reference to FIG. 7. FIG. 7 is a flowchart showing another example (Example 2) of the biometric authentication process that the authentication device 1 executes.

Example 2 describes a case that the user inputs a plurality of visual line directions by blinking. Example 2 is different from Example 1 in that the visual-line detecting unit 22 specifies a plurality of visual line directions. Therefore, portions different from Example 1 are mainly described.

As shown in FIG. 7, the display control unit 26 executes the processing of S11 to S14 without making a visual-line direction-type image to be displayed, in the similar manner to that in Example 1. In S14, when a predetermined number of authentication permission visual-line directions is not detected (NO in S14), the visual-line detecting unit 22 waits until the blink detecting unit 27 detects a blink (S21). When the blink detecting unit 27 detects a blink (YES in S21), the image obtaining unit 21 obtains an input image (S11), and the visual-line detecting unit 22 detects a next visual line direction and outputs the next visual line direction to the biometric deciding unit 24 (S12). The biometric deciding unit 24 executes a decision process in S13.

When a predetermined number of authentication permission visual-line directions are detected in a predetermined order of the authentication-permission visual-line information 32 (YES in S14), in the similar manner to Example 1, the biometric deciding unit 24 executes the processing of S15 and S16.

Example 3

Figure 8:
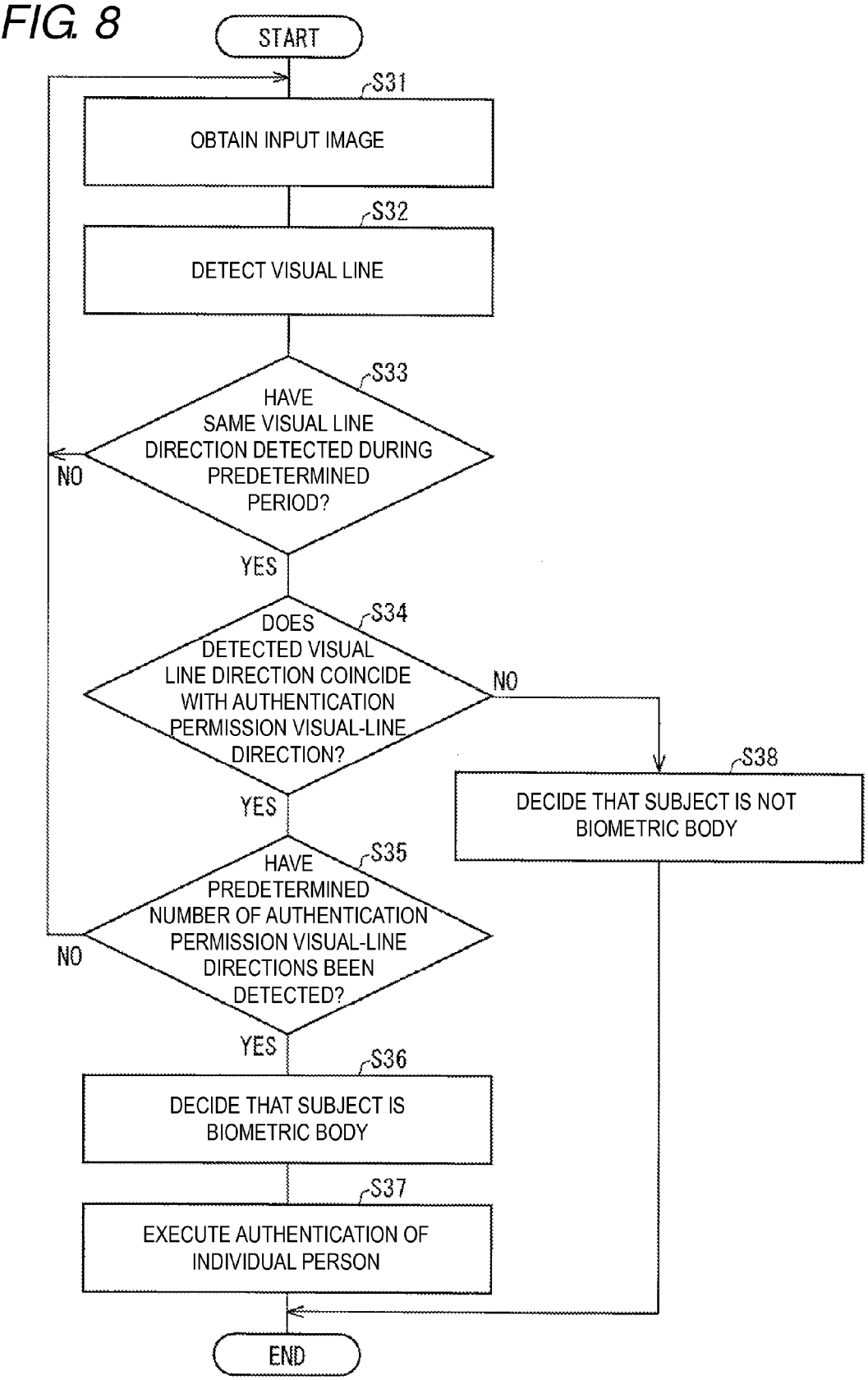
FIG. 8 is a flowchart showing still another example of an authentication process that the authentication device executes.

Next, still another example of the biometric authentication process that the authentication device 1 executes is described with reference to FIG. 8. FIG. 8 is a flowchart showing still another example (Example 3) of the biometric authentication process that the authentication device 1 executes.

Example 3 describes a case that one visual line direction is input by the user who gazes at the same visual line direction during a constant time. Example 3 is different from Example 1 in that the visual-line detecting unit 22 specifies a plurality of visual line directions. Therefore, portions different from Example 1 are mainly described.

As shown in FIG. 8, in the similar manner to that in S11 and S12 in Example 1, the display control unit 26 does not make the visual-line direction-type image to be displayed, the image obtaining unit 21 obtains an input image (S31), and the visual-line detecting unit 22 detects a visual line direction of the user from the input image (S32).

Only when the visual-line detecting unit 22 detects the same visual line direction during a predetermined period, the visual-line detecting unit 22 outputs the detected visual line direction to the biometric deciding unit 24 (S33). In the example shown in FIG. 8, the visual-line detecting unit 22 executes a detecting process during a predetermined period until detecting the same visual line direction. However, when a visual line direction of the user is not determined, the visual-line detecting unit 22 may end the detecting process and the authentication process.

Next, the biometric deciding unit 24 decides whether a visual line direction detected by the visual-line detecting unit 22 is the authentication permission visual-line direction (S34). When a visual line direction detected by the visual-line detecting unit 22 is the authentication permission visual-line direction (YES in S34), the biometric deciding unit 24 subsequently decides whether a predetermined number of authentication permission visual-line directions have been detected in a predetermined order of the authentication-permission visual-line information 32 (S35). When a predetermined number of authentication permission visual-line directions are not detected (No in S35), the processing of S31 to S34 are repeated.

When a predetermined number of authentication permission visual-line directions are detected in a predetermined order of the authentication-permission visual-line information 32 (YES in S35), the biometric deciding unit 24 decides that the subject is a biometric body (S36). Then, the eligible-person deciding unit 25 decides whether the subject is the owner, based on the image, and executes authentication of an individual person (S37).

In S34, when a visual line direction detected by the visual-line detecting unit 22 is not the authentication permission visual-line direction (NO in S34), the biometric deciding unit 24 decides that the subject is not a biometric body (S38), and ends the processing without executing authentication of an individual person.

Example 4

Figure 9:
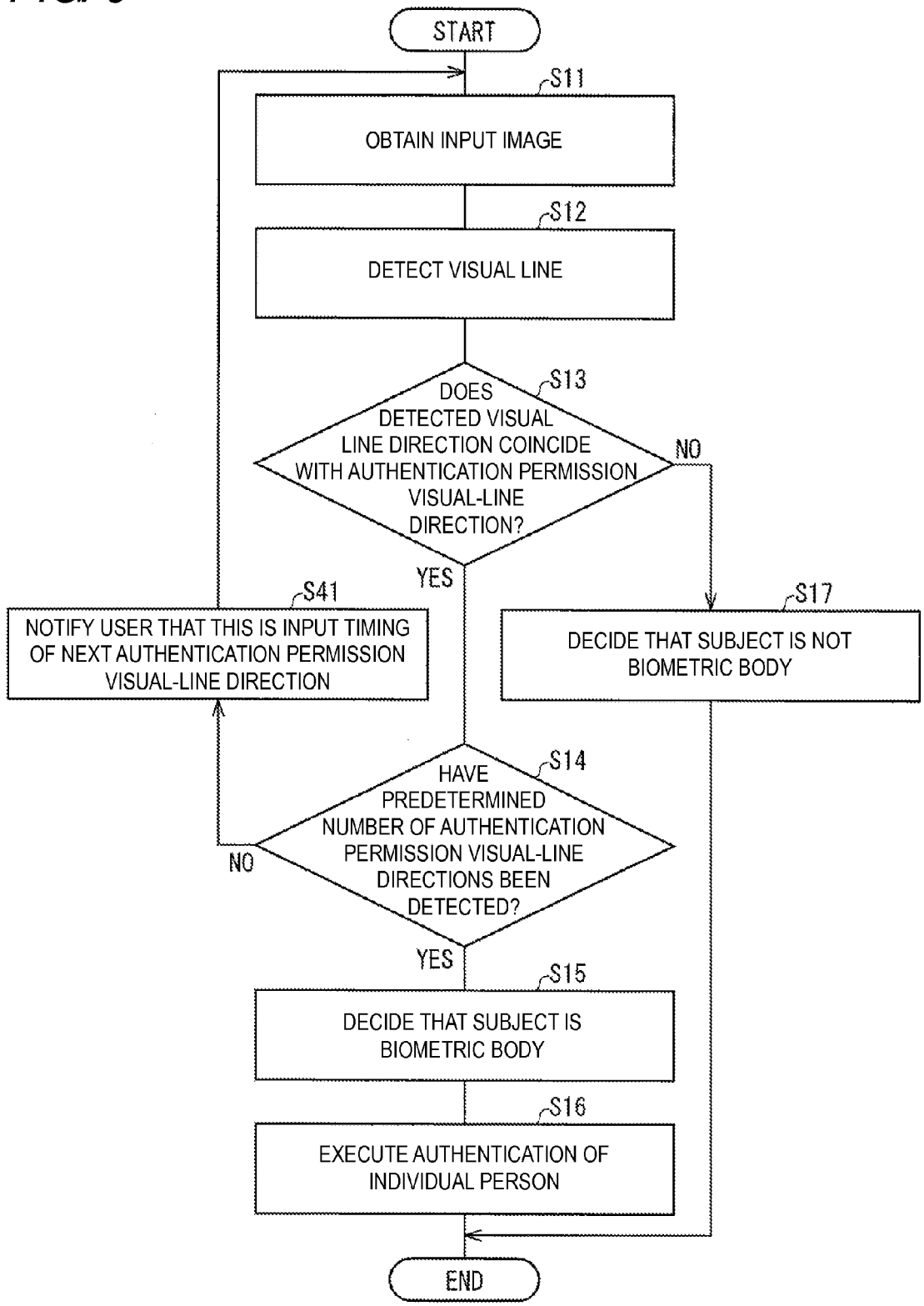
FIG. 9 is a flowchart showing yet another example of an authentication process that the authentication device executes.

Next, yet another example of the biometric authentication process that the authentication device 1 executes is described with reference to FIG. 9. FIG. 9 is a flowchart showing yet another example (Example 4) of the biometric authentication process that the authentication device 1 executes.

Example 4 describes a case that the user inputs a next visual line direction by looking at an image that instructs the user to input a next visual line direction, the image being displayed on the display unit 14. Example 4 is different from Example 1 in a method in which the visual-line detecting unit 22 specifies a plurality of visual line directions. Therefore, portions different from Example 1 are mainly described.

As shown in FIG. 9, the display control unit 26 executes the processing of S11 to S14 without making a visual-line direction-type image to be displayed, in the similar manner to that in Example 1. In S14, when a predetermined number of authentication permission visual-line directions are not detected (NO in S14), the display control unit 26 displays in the display unit 14 an image that instructs the user to input a next visual line direction, and notifies the user that this is an input timing of a next authentication permission visual-line direction (S41). Thereafter, the image obtaining unit 21 obtains an input image (S11), and the visual-line detecting unit 22 detects a next visual line direction, and outputs the next visual line direction to the biometric deciding unit 24 (S12). The biometric deciding unit 24 executes a decision process in S13.

When a predetermined number of authentication permission visual-line directions are detected in a predetermined order of the authentication-permission visual-line information 32 (YES in S14), in the similar manner to Example 1, the biometric deciding unit 24 executes the processing of S15 and S16.

(Example of Realization by Software)

Control blocks (particularly, the controller 11) of the authentication device 1 may be realized by a logic circuit (hardware) formed in an integrated circuit (IC chip) and the like, or may be realized by software by using a CPU (Central Processing Unit).

In the latter case, the authentication device 1 includes the CPU that executes instructions of programs as software for realizing each function, a ROM (Read Only Memory) or a storage device (these are referred to as "recording mediums" or "non-transitory computer-readable recording mediums") in which the programs and various data are recorded to be able to be read by a computer (or the CPU), and a RAM (Random Access Memory) that develops the programs. Then, when the computer (or the CPU) executes the programs by reading the programs from the recording mediums, the object of the present invention is achieved. For the recording mediums, it is possible to use "non-transitory tangible media" such as a tape, a disc, a card, a semiconductor memory, and a programmable logic circuit. The programs may be supplied to the computer via a transmittable arbitrary transmission medium (a communication network, a broadcasting wave, and the like). The present invention can be also realized in a mode of a data signal embedded in a carrier wave in which the programs are embodied by electronic transmission.

(Summary)

An authentication device according to an embodiment is an authentication device that executes authentication based on an image. The authentication device includes a visual-line detecting unit configured to detect a visual line direction of a subject photographed in the image, an authentication-permission visual-line direction setting unit configured to set a visual line direction for permitting authentication, an authentication executing unit configured to execute authentication by deciding whether a visual line direction detected by the visual-line detecting unit is an authentication permission visual-line direction set by the authentication-permission visual-line direction setting unit, and a display control unit configured to cause a display unit to display an image showing a type of a visual line direction in setting an authentication permission visual-line direction by the authentication-permission visual-line direction setting unit and configured to cause the display unit not to display the image in executing authentication by the authentication executing unit.

According to the above configuration, in executing authentication, because an image showing a type of a visual line direction is not displayed, it is difficult for other person to understand the authentication method. Therefore, there is an effect that improper authentication can be prevented.

In an embodiment, an authentication device may make the display unit display an image that does not suggest a type of the visual line direction in executing authentication by the authentication executing unit.

According to the above configuration, in executing authentication, an image that does not suggest a type of the visual line direction, for example, a black image, is displayed. Therefore, it is difficult for other person to understand the authentication method. Consequently, improper authentication can be prevented.

In an authentication device according to an embodiment, the authentication-permission visual-line direction setting unit may set a plurality of authentication permission visual-line directions in a predetermined order, and the authentication executing unit may execute authentication by deciding whether the visual-line detecting unit has detected the plurality of authentication permission visual-line directions in a predetermined order set by the authentication-permission visual-line direction setting unit.

According to the above configuration, in order to execute authentication, a plurality of visual line directions may be input in a predetermined order. Therefore, improper authentication may be prevented.

In an embodiment, an authentication device further includes a blink detecting unit configured to detect a blink of the subject, and when the blink detecting unit detects a blink, the visual-line detecting unit may detect a next visual line direction.

According to the above configuration, the visual-line detecting unit detects a visual line direction in each period divided by a blink of the user. Therefore, the user can continuously input a plurality of visual line directions by performing a simple movement.

In an embodiment, in an authentication device, when the visual-line detecting unit detects a visual line direction of a certain direction during a predetermined period, the visual-line detecting unit may detect a next visual line direction.

According to the above configuration, the user can continuously input a plurality of visual line directions by performing only a simple movement of gazing at a certain direction during a predetermined period.

In an embodiment, in an authentication device, when the display control unit causes the display unit to display an image that urges input of a next visual line direction, the visual-line detecting unit may detect a next visual line direction.

According to the above configuration, the user can continuously input a plurality of visual line directions by just following the image displayed in the display unit.

An authentication method according to an embodiment is an authentication method of executing authentication based on an image. The authentication method includes an authentication-permission visual-line direction setting step of setting a visual line direction for permitting authentication, a visual-line detecting step of detecting a visual line direction of a subject photographed in the image, and an authentication executing step of executing authentication by deciding whether a visual line direction detected in the visual-line detecting step is an authentication permission visual-line direction set in the authentication-permission visual-line direction setting step. In the authentication-permission visual-line direction setting step, a display unit is made to display an image showing a type of a visual line direction, and in the authentication executing step, the display unit is not made to display the image.

The authentication device according to the above embodiments may be realized by a computer. In this case, a control program of the authentication device, the control program recorded in a non-transitory computer-readable recording medium, including instructions that causes the computer to realize the authentication device by operating the computer as each unit included in the authentication device is included in an embodiment.

The present invention is not limited to the above embodiment, and can be variously changed within a range described in claims. That is, an embodiment obtained by combining technical units suitably changed within a range described in claims is also included in a technical range of the present invention.

INDUSTRIAL APPLICABILITY

The present invention can be used for an authentication device that executes authentication by detecting a visual line of the user.

What is claimed is:

1. An authentication device configured to execute authentication based on an image, the authentication device comprising:
   a processing unit configured to control the authentication device to operate as:
      a visual-line detecting unit configured to detect a visual line direction of a subject photographed in the image;
      an authentication-permission visual-line direction setting unit configured to set a visual line direction for permitting authentication;
      an authentication executing unit configured to execute authentication by deciding whether a visual line direction detected by the visual-line detecting unit is an authentication permission visual-line direction set by the authentication-permission visual-line direction setting unit; and
      a display control unit configured to cause a display unit to display an image showing a type of a visual line direction in setting an authentication permission visual-line direction by the authentication-permission visual-line direction setting unit and display an image that does not suggest a type of the visual line direction in executing authentication by the authentication executing unit, the display control unit being further configured to cause the display unit not to display the image in executing authentication by the authentication executing unit.

2. The authentication device according to claim 1, wherein the authentication-permission visual-line direction setting unit is configured to set a plurality of authentication permission visual-line directions in a predetermined order and the authentication executing unit is configured to execute authentication by deciding whether the visual-line detecting unit is detected the plurality of authentication permission visual-line directions in a predetermined order set by the authentication-permission visual-line direction setting unit.

3. The authentication device according to claim 2, further comprising a blink detecting unit configured to detect a blink of the subject, wherein
   the visual-line detecting unit is configured to detect a next visual line direction when the blink detecting unit detects a blink.

4. The authentication device according to claim 2, wherein the visual-line detecting unit is configured to detect a next visual line direction upon detecting a visual line direction of a certain direction during a predetermined period.

5. The authentication device according to claim 2, wherein the visual-line detecting unit is configured to detect a next visual line direction when the display control unit causes the display unit to display an image that urges input of a next visual line direction.

6. A non-transitory computer-readable recording medium for storing codes of a control program, including instructions for operating the authentication device according to claim 1, wherein the control program includes instructions executable by the processing unit to control the authentication device to operate as each of the units.

7. A non-transitory computer-readable recording medium for storing codes of a control program, including instructions for operating the authentication device according to claim 2, wherein the control program includes instructions executable by the processing unit to control the authentication device to operate as each of the units.

8. A non-transitory computer-readable recording medium for storing codes of a control program, including instructions for operating the authentication device according to claim 3, wherein the control program includes instructions executable by the processing unit to control the authentication device to operate as each of the units.

9. A non-transitory computer-readable recording medium for storing codes of a control program, including instructions for operating the authentication device according to claim 4, wherein the control program includes instructions executable by the processing unit to control the authentication device to operate as each of the units.

10. A non-transitory computer-readable recording medium for storing codes of a control program, including instructions for operating the authentication device according to claim 5, wherein the control program includes instructions executable by the processing unit to control the authentication device to operate as each of the units.

11. An authentication method for executing authentication based on an image, the authentication method comprising:
   setting a visual line direction for permitting authentication;
   detecting a visual line direction of a subject photographed in the image;

executing authentication by deciding whether the detected visual line direction is an authentication permission visual-line direction set for permitting authentication; and displaying, on a display unit, an image showing a type of a visual line direction, during setting of the visual line direction for permitting authentication, in the, not displaying the image, during executing authentication, and displaying an image that does not suggest a type of the visual line direction during executing authentication.

* * * * *